Oct. 14, 1947.  R. W. DE LANCEY  2,428,867
FUEL CONTROL FOR FURNACES
Filed Nov. 13, 1943  2 Sheets-Sheet 1
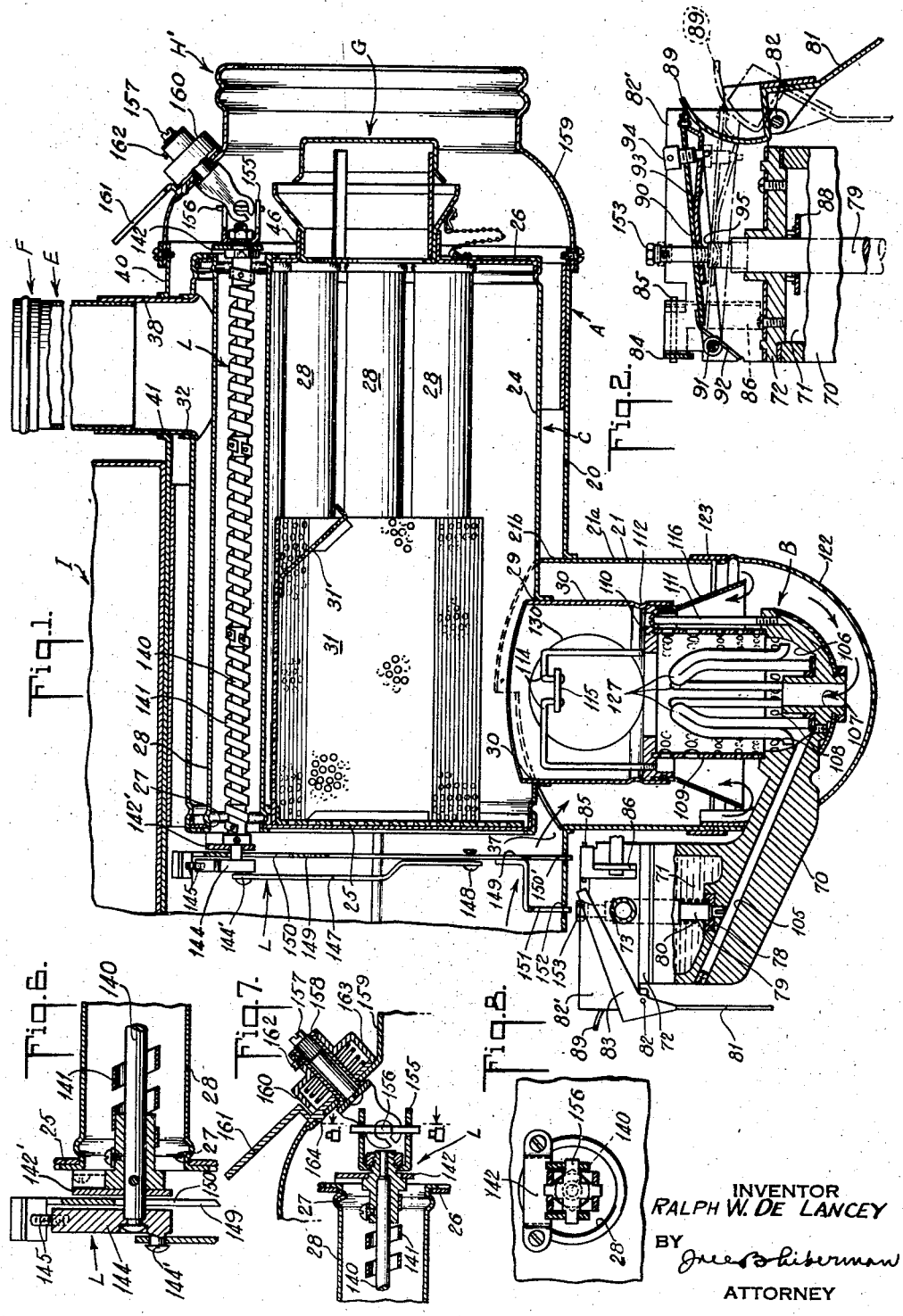
INVENTOR
RALPH W. DE LANCEY
BY
ATTORNEY Oct. 14, 1947.  R. W. DE LANCEY  2,428,867
FUEL CONTROL FOR FURNACES
Filed Nov. 13, 1943  2 Sheets-Sheet 2
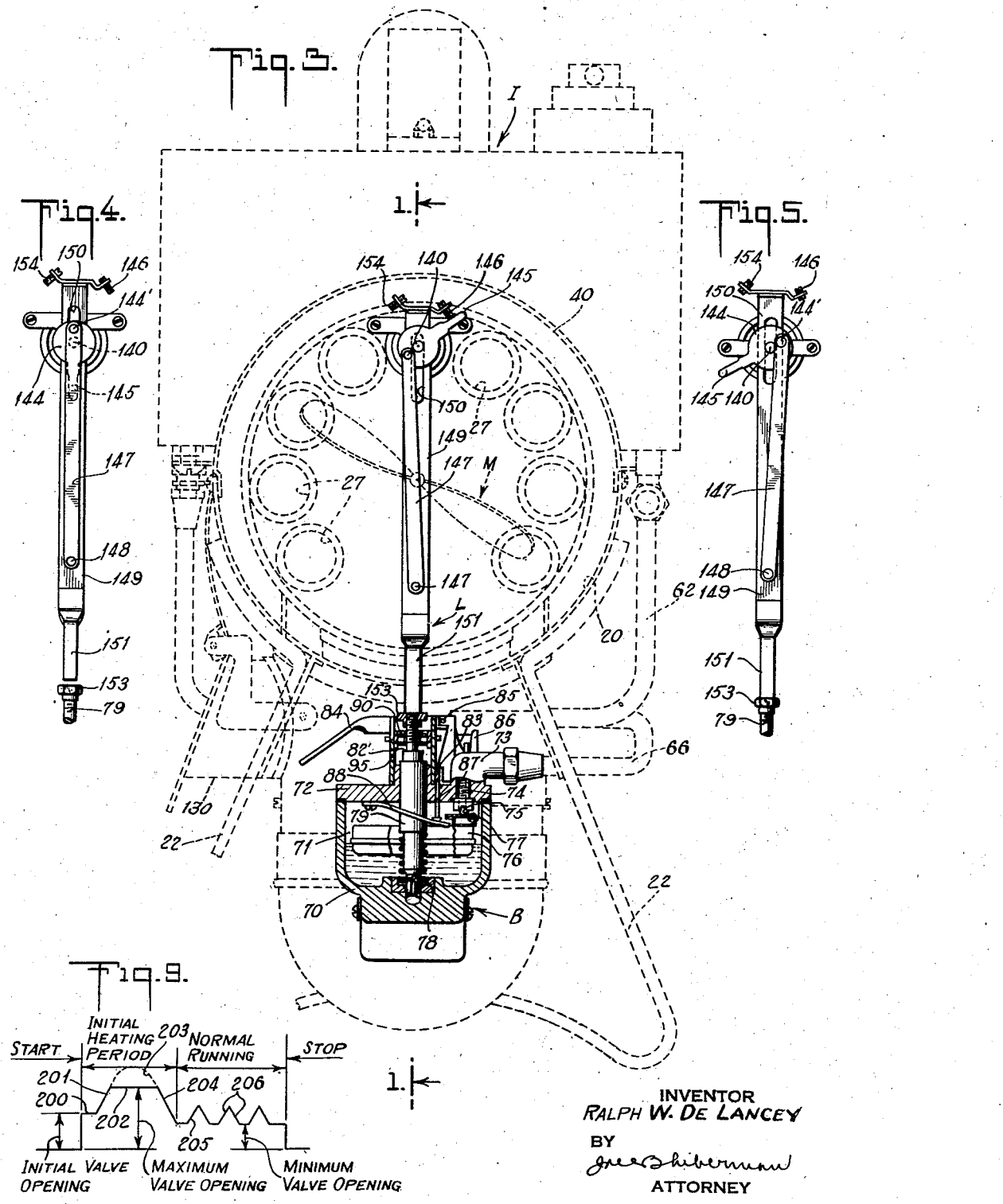
INVENTOR
RALPH W. DE LANCEY
BY
ATTORNEY Patented Oct. 14, 1947

2,428,867

UNITED STATES PATENT OFFICE 2,428,867

FUEL CONTROL FOR FURNACES

Ralph W. De Lancey, Meriden, Conn., assignor to The Miller Company, Meriden, Conn., a corporation of Connecticut Application November 13, 1943, Serial No. 510,184

11 Claims. (Cl. 236—10)

The present invention relates to fuel control for furnaces, and is more particularly directed toward the control of liquid fuel supplied to house heating or portable furnaces where the control of the starting and stopping of the furnace operation does not include the conventional room thermostat.

Where a room thermostat is employed the liquid fuel burner is operated intermittently, the duration of the firing period and the length of the cycle can therefore vary so as to compensate for variant outside ambient temperatures.

Where the fuel control is entirely manual as to time of start and rate of flow, as in space heaters or furnaces with simple manual valves, the B. t. u. output of the burner remains substantially constant and therefore the rise in temperature of the heating medium would be about the same. The setting made manually may therefore be too high or two low a short time later when the outer ambient temperature has changed. A setting satisfactory for a cool evening will result in overheating the house, should the weather moderate during the night, while insufficient heat will be had, should the temperature take a sudden drop.

The present invention contemplates that after the furnace is brought into operation the circulation of heating medium whether air or water should be continuous until the furnace is shut down. Accordingly the manual control whereby the metering valve is initially opened and is finally closed is associated with an overriding control responsive to attained temperature of the circulating medium which alternately lowers the flow rate below the maximum possible flow rate in an amount to substantially lower the heat output, and then allows the flow rate to increase to build up the firing rate and output so that the temperature attained by the circulating medium may be confined within a comparatively narrow range, and this is accomplished irrespective of changes in the ambient outside temperature provided the temperature rise required does not exceed furnace capacity.

An illustrative embodiment of the present invention is one designed as a portable heater for use at extremely low temperatures, for example, minus 40° F., in the heating of automotive equipment so that it may be started, many of the features are suitable for more general use, such as heaters for small buildings and enclosures, unit heaters for localized heating, heaters for operations which must be performed in exposed locations, and in drying and dehydrating equipment.

For the primary purpose above mentioned the furnace is adapted for operation as an isolated portable unit and employs gasoline or fuel oil for fuel and an internal combustion engine (or electric motor) to operate a blower to produce the blast of air. The furnace has a vaporizing type liquid fuel burner supplied with fuel through a gravity feed line under the control of a metering valve, and the entire starting, stopping and firing rate control for the burner is accomplished through this metering valve. The metering valve is normally completely closed and is adapted to be manually opened when the burner is to be started in operation and manually or automatically closed when operation of the burner is to be discontinued, and the extent of opening of the metering valve is controlled throughout the period that the burner is in operation by a thermal motor subjected to the air in the passages through which the air to be heated is circulated.

When the heater is not in operation the metering valve is held closed in any suitable manner, and manual means is provided for opening the metering valve to allow fuel to flow from a fuel storage chamber down into the vaporizer. The fuel in the vaporizer is lighted either electrically or by means of a torch, and the burner operates as a natural draft burner during the initial preheating period, and during this period the flow rate is that determined by the extent to which the metering valve is then open.

The operation of the burner under natural draft warms the furnace and the thermal motor, and this thermal motor then takes over control of the metering valve. The initial preheating period for the furnace also allows preheating of the internal combustion engine to operate the blower so that this blower can be put into operation when desired. The operation of the blower which supplies forced draft to the burner, as well as circulates air through the passages in the furnace, makes it possible to consume fuel at a higher rate than it could be burned under natural draft, and in order to permit operation at this high rate and accelerate heating up of the furnace the thermal motor is arranged to allow the metering valve to come to its greatest opening so that the entire equipment is rapidly brought to a higher temperature.

As this initial forced draft firing rate is much greater than the firing rate necessary to maintain the heater at the optimum temperature desired the thermal motor is arranged to gradually reduce the fuel supply, and this reduction of supply of fuel continues until the optimum temperature is reached at which time the fuel supply is reduced to an amount sufficient to keep the burner in operation but insufficient to heat the furnace to the desired temperature. This causes the thermal motor to cool off which effects an opening of the metering valve so as to supply more fuel. It will thus be seen that during an initial operation of the burner it can operate at a very high firing rate, while during normal operation the firing rate continuously changes from an intermediate high firing rate to a moderately low firing rate.

As the combustion capacity of the burner exceeds the fuel feeding capacity of the metering valve and the thermal motor follows very closely the combustion rate of the burner, the metering valve is moved back and forth in a comparatively short cycle. In this manner the desired temperature for the blast of air is maintained within reasonable limits and the metering valve is continuously moved back and forth. In an installation the rapidity of this cycle will depend upon the temperature rise required to reach the temperature required.

Where the present invention is embodied in stationary heaters, such as space heaters, any suitable form of liquid fuel burner and metering valve may be used with a suitable form of space heater. It may be used where power is available for forced draft and forced circulation or with a natural draft burner operating in a circulating heater. The physical layout of the apparatus may therefore be considerably varied.

The accompanying drawings show, for purposes of illustrating the present invention, an embodiment in which the invention may take form, it being understood that the drawings are illustrative of the invention rather than limiting the same.

In these drawings:

Figure 1 is a longitudinal sectional view through a portable heater taken on the line 1—1 of Figure 3, the parts being arranged for delivering contaminated air and the metering valve closed;

Figure 2 is a fragmentary vertical sectional view taken on the line 1—1 of Figure 3 looking in a direction opposite to Figure 1, but at a larger scale, showing the metering valve in full lines in open position and in dotted lines in closed position;

Figure 3 is an end elevational view taken from the left of Figure 1 showing the furnace in dotted lines and the control mechanism for the metering valve in full lines, the parts being in the starting position and cold;

Figure 4 is a fragmentary view of the air temperature responsive mechanism taken in the same direction as Figure 1 showing the parts in the position for maximum fire;

Figure 5 is a view similar to Figure 4 showing the parts in an intermediate operating position where the firing rate is being controlled by the air temperature responsive apparatus;

Figure 6 is an enlarged sectional view taken on the same plane as Figure 1 showing the left end of the air temperature responsive thermostat;

Figure 7 is a view taken similar to Figure 6 but showing the right hand end of the air temperature responsive thermostat;

Figure 8 is a section taken on the line 8—8 of Figure 7; and

Figure 9 is a diagram illustrating the various positions of the metering valve during operating cycle.

The bottom housing unit A of the portable hot air heating furnace has a semi-cylindrical bottom housing member 20, to which is welded a tubular burner housing 21. This burner housing tube extends below the bottom housing member 20 as indicated at 21a (Figure 1) and above it as indicated at 21b. The unit A also has legs 22 for support.

The combustion drum C has an outer cylindrical body 24, and end walls 25 and 26. These end walls have aligned openings 27, which receive air tubes 28. The bottom part of the drum body 24 is provided with an opening 29 in which is welded a downward extending fire tube 30 near one end of the combustion drum and concentric with tube 21. The adjacent wall 25 of the combustion chamber supports an inverted box-like baffle 31 having a deflector 31'. This baffle protects the adjacent portions of the air tubes 28 from direct impingement of the flame and yet permits the hot gases to pass out about these air tubes. The combustion drum is provided with a stack opening 32 at the top and at the end opposite the fire tube 30. The upper edge of the tube 21 engages the lower surface of the drum 24 in the side away from the end wall 25 so as to provide an opening 37 for supplying air to the burner B. A short tube 38 is welded into the stack opening 32.

The top housing unit D has a semi-cylindrical top housing member 40, similar to the bottom housing member 20, but provided with an opening 41 over the stack tube 38. The top housing member 40 fits over the top of the combustion drum and the top and bottom housing members are secured together in any suitable manner the stack tube 38 passing up through the opening 41 and receiving later the stack E. The housing accommodates a blower whose fan is indicated at M and this blower acts to force air through the space between the combustion drum and housing and the tubes 28, as well as air for combustion through opening 37.

The stack E is provided with a renewable cap F so that the products of combustion may pass up the stack or not as desired. In order to permit the products of combustion to escape from the drum without going up the stack, the end wall 26 of the drum is provided with flanged opening 46 adapted to receive and support a reversible plug G. When the plug is in the position shown it permits the products of combustion to escape through it. When, however, the plug G is withdrawn, reversed end for end and reinserted the products of combustion cannot pass through. The air delivery cover H' shown herein is one adapted to receive a duct, usually of fabric, for conducting air to the region to be heated. It serves to receive the air blown through the combustion drum and the space between the combustion drum and the housing, as well as the contaminated air when the plug G and the cap F are in proper position for delivering contaminated air.

The fuel supply tank I delivers fuel through pipes 62, 63 and 66 to the fixedly supported burner control valve unit B.

The body casting of the burner valve control unit B is designated by the reference character 70. It has a float chamber 71 which is closed off by a cover 72. The cover has a rearwardly extending tubular coupling element 73 for coupling to the fuel line 66. A valve seat member 74 is threaded into the cover member 72 and this valve seat member 74 receives a valve pin 75 which is normally controlled by a float 76 hinged at 77. When the parts are in the position shown in Figure 3 the float 76 and float control valve 75 operate similarly to the float valve in an automobile engine carburetor and maintain a predetermined supply of fuel in the float chamber 71. The casting 70 is provided with an outlet valve seat insert 78 at the bottom of the float chamber, which cooperates with a metering valve stem 79 urged upwardly by a spring 80 and downwardly by mechanisms to be described. This valve forms the metering valve for the burner.

The constant level valve and metering valve are under manual control for the purpose of starting and stopping the burner and the metering valve is under continuous automatic control for normal continuous operation. These controls will now be described.

The starting lever for opening the fuel line into the fuel chamber 71 is shown at 81. It is pivoted at 82 to the U-shaped stamping 82' carried by the cover member and has a general horizontally extending arm 83, which overlies the top of the cover member 72. When it is in the burner operating position shown in Figures 2 and 3 the inner end of this arm 83 is latched in place by a lever 84 pivoted at 85 to the stamping 82' and having a rear extension 86.

When the starting lever 81 is latched in this normal operating position, the arm 83 presses down on a pin 87 which extends through the float chamber cover 72 and normally rests on the top of a leaf spring 88. This leaf spring is carried by the underside of the cover 72 and is normally urged upwardly. It is arranged as shown in Figure 3 to be free of the float mechanism when in that position, but when the starting lever 81 is in the shut off position, as indicated in dot-and-dash lines in Figure 2 and in full lines in Figure 1, the pressure on the leaf spring 88 is removed and this spring is able to act on the float mechanism, so as to move it into the position to move the valve 75 to closed position and at the same time it will lock the float mechanism against vibration during shipment or transportation of the burner.

The starting lever 81 has a cam 89 adapted to act on a lever 90 pivoted to the stamping 82' at 91 and urged downwardly by a coiled spring 92. The lever 90 carries a leaf spring 93 whose position can be adjusted by high fire adjustment screw 94. The free end of the spring 93 extends above shoulder 95 on the valve stem 79 and is out of contact with this shoulder when the parts are in starting position. The spring 93, however, limits the height to which the metering valve stem may be moved by the coiled spring 80.

When the starting lever 81 is shifted to open the valves and the furnace is cold, the metering valve will open to an extent determined by the air temperature control unit L in a manner to be described below. The fuel will then be allowed to flow through the metering valve at a predetermined rate which is the proper rate (more than pilot and less than maximum fire) for starting the burner. The fuel will pass down a sloping passage 105, see Figure 1, and enter the vaporizer 106, forming the other end of the body 70 of the burner unit B. To start ignition a torch may be inserted through a normally closed lighting tube 130 as described fully in application Serial No. 510,181.

The vaporizer 106 has a central air tube 107 and a row of downwardly and inwardly extending air holes or drillings 108. The vaporizer carries a perforated sleeve 109, and clamped in position by a ring 110 and bolts 111. The ring 110 is just the proper size to fit into the fire tube 30 and this tube is provided with a bead 112 to provide a stop for the ring. The ring is provided with perforations (not shown) and carries upwardly extending rods 114 which support a flame spreading plate 115. The ring 110 also carries a downwardly and outwardly flaring skirt 116 which terminates just above the top of the vaporizer 106. The skirt compels the air to pass underneath it to where air is preheated. This skirt also acts to prevent flame from passing out through the sleeve 109 and up the tube 21.

The bottom of the down draft tube 21 is closed off by a hemispherical stamping 122, which fits into the ring 123 carried by the bottom of the tube 21. As shown more clearly in Figure 1, the riser or air tube 107 receives a ring which carries a number of fingers 127 of heat resistance wire of good thermal conducting material. These fingers extend up into the combustion space and carry heat down into the bottom of the vaporizer.

The air temperature responsive thermostatic apparatus for controlling the metering valve shown generally at L includes a shaft 140 which extends through the upper air tube 28 and this shaft carries a bimetallic coiled thermostat 141. This shaft is carried on brackets 142, 142' secured to the front end plate 26 and the rear end plate 25 of the combustion drum. The rear end of the thermostat coil 141 is fixedly secured to the shaft 140 and this shaft carries a member 144, having arm 145 which normally engages a stop 146 when the thermostat is cold, see Figure 3. The member 144 is secured at 144' to a connecting rod 147 which extends downwardly. The lower end 148 of the connecting rod is secured to a slider 149 slotted at the top as indicated at 150 and passing about the support of the shaft 140. The lower end of the slider 149 passes through an opening 150' in the housing 20. This slider carries a bracket member 151 which extends down through another opening 152 in the housing 20.

The bracket 151 overlies the top of the metering valve stem 79 and this stem is provided with an adjusting nut 153 whereby the extent of the opening of the metering valve may be controlled when the arm 145 carried by thermostatically operated member 144 is held against the stop 146. In this way the flow for the starting fire is maintained. As the temperature of the combustion drum rises and the thermostat 141 becomes heated, it turns the element 144 in a clockwise direction, as viewed in Figures 3, 4 and 5. This will cause the bracket 151 to move up away from the metering valve so that the metering valve will be moved to the maximum open position as determined by the high fire adjustment nut 94. Further expansion of the thermostat 141 will cause the pivot point 144' between parts 144 and 147 to pass over the center and then the parts 147, 148, 151 will move down. At the same time the stop arm 145 will pass around and approach the adjustable stop 154 shown in Figures 3, 4 and 5.

The shaft 140 carrying the bimetallic coiled thermostat 141 is provided with a yoke 155, and this yoke is connected through universal joint connections 156 with a shaft 157. This shaft extends out through a guide tube 158 carried by the discharge or air delivery cover 159. The tube 158 carries a spring casing member 160 and an operating handle 161. The casing 160 can be secured to the shaft 157 in any desired position by a lock screw 162 and a spring 163 forces the handle 161 toward the walls of the cover 159. To keep the arm 161 in adjusted position it is provided with a boss 164 adapted to enter into selected openings around the axis of the shaft 157. When the device is first assembled adjustments are made when the screw 162 is loose. The handle 161 is then placed in its proper position and the screw 162 tightened, after which adjustments of the thermostat may be made at will to vary the temperature of the air delivered without disturbing any of the other parts of the device.

The sequence of metering valve stem movements is indicated in Figure 9. The initial opening of the metering valve is indicated at the left at 200. At this time the nut 153 on the valve stem engages bracket 151 and this bracket is held in its highest cold position by stop 146. As soon as the thermostat 141 heats up enough to move the driven parts the slider 149 is lifted and this allows the valve stem 79 to rise under the influence of spring 80. This rise is indicated at 201. The maximum valve opening determined by stop 94 is indicated at 202. The further heating of coil 141 continues the angular movement of 144 and the lifting of 149 and 151 until pivot point 144' reaches the upper position shown in Figure 4. Then the pivot point 144' lowers as indicated in Figure 5 and the part 151 reengages nut 153. The time when 151 is separated from 153 is indicated by doted line 203 in Figure 9. The further heating of the coil 141 causes the valve stem to be moved toward its closed position in an amount determined by the stop 154. This closing movement is indicated in Figure 9 at 204. This reduces the firing rate to so low an amount that the delivered air temperature falls and the cooling off of the thermostat 141 then causes an opening of the valve as indicated at 205. The satisfaction of the thermostat will again cause a reduction of the firing rate and the continuously varying firing rate is indicated by the saw tooth line 206 at the right of Figure 9.

It will thus be seen that when the furnace is in continuous operation the thermostat 141 operates back and forth between the position where it permits high or maximum high fire operation and the position where it allows only pilot operation. The intensity of the fire, therefore, varies between the maximum and minimum, so that there is no likelihood of overheating the parts, or delivering the air at too high a temperature, or of extinguishment of the flame.

The flow rate of a metering valve at any selected adjustment varies very widely over ranges of temperature from —40° F. to room temperatures so that an adjustment for the very low temperature would allow a great excess of fuel to flow at the higher ambient temperature. By having the metering valve move back and forth it is possible to have the maximum flow rate when operating for a high temperature rise of the air forced through the furnace and to rely on the thermostat to reduce the flow rate to the average amount needed.

At temperatures above about —20° F. gasoline and fuel oil are able to retain a small amount of water in what appears to be a solution, but below this temperature the water is thrown out of solution in the form of minute ice crystals, so small that they will not all be retained on the fine sieve in the strainer. Some of these crystals pass into the float chamber and tend to accumulate about the metering valve stem and to clog the orifice of the metering valve stem, especially when the stem is fixed. By moving the stem back and forth these crystals are crushed and pushed through the orifice. When the float chamber warms up the ice crystals melt so as to form small droplets of water. These tend to move toward the metering valve stem slot and are forced on through to the burner. Accumulation of water in the vaporizer is prevented by the hot rods or fingers 127.

Portions of the subject matter herein shown are also shown and claimed in concurrently filed applications Serial Nos. 510,181, 510,182 and 510,183.

Since it is obvious that the invention may be embodied in other forms and constructions within the scope of the claims, I wish it to be understood that the particular form shown is but one of these forms, and various modifications and changes being possible, I do not otherwise limit myself in any way with respect thereto.

What is claimed is:

1. In a hot air furnace, a thermostat subjected to the furnace temperature of the heating medium and operable in response thereto between low temperature and high temperature stops, a gravity fed liquid fuel fired burner for the furnace, a liquid fuel supply metering valve biased toward a maximum open position which provides a firing rate in excess of that required to maintain the furnace at the high temperature, and a reciprocating member operated by said thermostat, said member having lost-motion pressure-transmitting means for applying pressure to the metering valve, said reciprocating member, when the thermostat is against either of the stops, limiting the opening of the metering valve to less than the maximum open position, the reciprocating member having a range of movement in one direction as the thermostat heats in excess of that necessary to allow the valve to fully open and a range of movement in the reverse direction on continued heating of the thermostat to bring it against the high temperature stop which reduces the valve opening to a lesser amount than that determined by the low temperature stop.

2. A hot air furnace having a gravity fed liquid fuel burner and controls to provide for initial preheating and subsequent normal operation wherein the firing rate during preheating is in excess of that during normal operation and the firing rate during normal operation is continuously varied back and forth, said controls comprising a liquid fuel metering valve having means to bias it in one direction, a movable stem, a stop limiting its maximum opening, a thermostat of the differential expansion type subject to furnace temperatures, and operably connected to the stem to limit, when cold, the movement of the stem in the biased direction and on rise of temperature to release the valve for opening to the maximum extent and then on further rise to reduce its opening and to vary the opening wider and narrower as the thermostat temperature lowers and rises, there being a high temperature stop for the thermostat which limits the extent to which the valve may be closed by the thermostat.

3. In a hot air furnace, a gravity fed liquid fuel burner, a metering valve having a stem biased toward open position and provided with a maximum high fire stop, a thermal responsive element subject to the temperature of the air in the furnace, an oscillatory member movable by the thermal responsive element between a low temperature stop and a high temperature stop, a reciprocatory member operably connected to the oscillatory member and a link connecting the oscillatory member and the reciprocatory member, the reciprocatory member bearing on the valve stem to limit its opening when the oscillatory member is against the low temperature stop and allowing the valve stem to further open as the oscillatory member shifts away from said low temperature stop, the link passing through and over the center position on continued heating of the thermal element so that the reciprocatory member presses the valve stem toward closed position until the high temperature stop is reached.

4. A forced draft, forced circulation hot air heater having a blower unit for delivering a substantially constant volume of air, a heat interchanger having fresh air passages through which a dominant part of the output of the blower unit passes, a forced draft operated furnace having an inlet passage through which the remainder of the output of the blower unit passes, a liquid fuel burner, and passages for the products of combustion from the burner and for excess air, the latter passages extending through the heat interchanger to heat the fresh air forced therethrough by the blower unit, a fuel supply system for the burner and having a metering valve to obtain a variable flow rate between a minimum amount sufficient to maintain a continuous fire under forced draft and a maximum amount and having a predetermined time lag, and a bimetallic temperature responsive element subjected to the temperature of the fresh air being heated in the interchanger and directly controlling the flow rate between said maximum and minimum amounts, the interchanger having a different time lag than the burner whereby the change of firing rate and the temperature attained by the bimetallic element are out of phase and the flow rate continuously varies.

5. A heating system having a furnace, a liquid fuel burner for firing the furnace, a metering valve for controlling the flow of liquid fuel to the burner and having a valve stem biased toward an open position, a stop limiting the maximum open position of the valve stem, a bimetallic thermostat in the heat output zone of the furnace, low temperature and high temperature stops limiting the movement of the thermostat, the thermostat having continuous movement away from the low temperature stop with increase of temperature of air in the furnace and toward said stop with lowering of temperature of air in the furnace, a reciprocatory valve stem operator positively connected to the thermostat to partake of all its movements and undergo reversal of direction during continuous movement of the thermostat in each direction, and, when said thermostat position is determined by the low temperature stop, engaging the valve stem to limit its opening to a predetermined amount less than the maximum, the thermostat on moving away from the low temperature stop first moving the operator to release the valve stem for movement toward its stop and after the valve stem has arrived at the maximum open position continuing to move further in the same direction without moving the valve stem and then reversing its direction until it reengages the valve stem whereupon, on further heating of the thermostat, the operator moves the valve stem toward closed position until the high temperature stop is reached which limits the extent to which the valve stem may be closed by the thermostat.

6. A system as in claim 5, wherein the connection between the thermostat and the valve operator includes an oscillatory member and a connecting rod one end of which is carried by the oscillatory member and the other by the operator.

7. A self-contained hot air heating system comprising a forced circulation hot air furnace, a gravity fed liquid fuel burner for heating the furnace, a metering valve for controlling flow of fuel to the burner and having a valve stem biased to move from a fully closed position to a maximum open position, a thermal motor in the furnace and responsive to the air being heated therein, the thermal motor including a bimetallic thermostatic element, a reciprocatory valve stem operator movable toward the valve stem an amount insufficient to close the valve and away from the valve stem sufficient to disengage itself from the valve stem so that the stem comes to the maximum open position, whereby the operator is only effective to control the firing rate in limited amounts less than the maximum, a first stop for controlling the initial firing rate, a second stop for controlling the minimum firing rate, and connections between the thermal motor and the valve stem operator which hold the operator in a position determined by the first stop to allow an intermediate opening of the valve when the thermostatic element is cold and on increase in temperature to first move the operator away from the first stop to release the valve stem for wider opening and continue to move it past the position where it disengages from the valve stem and on to one extreme position of its reciprocatory movement where neither stop interferes with its movement whereupon it starts in the other direction and moves toward the valve stem operator and the second stop until it reaches the valve stem operator and thereupon initiates a closing movement of the valve so long as the thermostat temperature increases and until the second stop is reached, the diminished firing rate being insufficient to maintain the circulating air at the maximum temperature so that the thermostatic element cools, the cooling movement being effective to increase the fuel flow and raise the temperature of the circulating air.

8. A valve having a vertical valve stem spring pressed toward an open position, a valve stem stop, a horizontal spirally wound bimetallic thermostat, an oscillatory member operated by the thermostat in accordance with the temperature of the thermostat, stops limiting thermostat movement, a link connected to the oscillatory member at a point which, when the thermostat is cold and arrested by one stop moves upwardly with increase of temperature until said point moves over the center of oscillation and then moves downwardly until the other stop is reached, and a vertically reciprocatory member connected to the other end of the link, the link acting to move the vertically reciprocatory member from a low position determined by the first stop to a high position and then lowering it to another low position determined by the other stop, the reciprocatory member engaging the valve stem and partially closing the valve whenever the member is against either stop, the reciprocatory member when in positions higher than those corresponding with the maximum valve opening being free of the valve stem.

9. In a heater which includes a circulating hot air furnace, a gravity fed liquid fuel burner for heating the furnace and a fuel metering valve biased to move from a fully closed position to a maximum open position, the improvement which comprises, a differential expansion type thermal motor subject to the air in the furnace, a low temperature stop limiting the movement of the thermal motor in one direction, the thermal motor having a continuous movement away from said stop with increase of temperature of air in the furnace and toward said stop with lowering temperature of air in the furnace, and thermal motor operated, valve controlling mechanism having back and forth movement with reversal in direction taking place during continuous movement of the thermal motor in each direction, the mechanism when positioned by the low temperature stop limiting the valve opening to an amount less than the maximum opening but substantially greater than that sufficient to maintain a pilot flame in the burner whereby substantial heat output may be obtained to increase furnace temperature, the mechanism acting on continued increase in temperature and while moving in one direction to first free the valve from restraint so that it fully opens and thereafter to change its direction of movement and reduce the opening of the valve, this reduction in amount of valve opening continuing with increase of temperature until the heat output is reduced below an amount sufficient to maintain the attained rise in temperature, whereby the burner, furnace and thermal motor become cooler and the thermal motor retraces its movement to correspondingly free the valve stem and allow the valve to open and increase the flow of fuel.

10. The combination of claim 9, having a high temperature stop, limiting the movement of the thermal motor on increase in temperature, the thermal motor then positioning the valve in the minimum open position to maintain a pilot flame in the burner.

11. In combination, a liquid fuel fired gravity fed burner, a hot air furnace heated thereby, a metering valve having a stem biased toward a maximum open position, manual means for releasing the valve stem and for moving it to closed position, a single thermal motor subject to air in the furnace, and thermal motor operated valve stem controlling linkage having, firstly, means for limiting the initial opening to an amount less than the maximum, secondly, means effective during a predetermined rise in furnace temperature for gradually freeing the valve stem from restraint so that it fully opens, thirdly, means effective at a further rise in temperature for reestablishing control of the valve stem and moving it nearer closed position than the initial opening, and fourthly, means operative upon subsequent cooling and heating to move the valve stem back and forth in a range of openings below the maximum opening.

RALPH W. DE LANCEY.

REFERENCES CITED

The following references are of record in the file of this patent:

UNITED STATES PATENTS

| Number | Name | Date |
| --- | --- | --- |
| 2,183,854 | Landon | Dec. 19, 1939 |
| 2,244,555 | Harris | June 3, 1941 |
| 2,254,481 | Harris | Sept. 2, 1941 |
| 2,329,473 | Landon | Sept. 14, 1943 |
| 2,230,446 | Baker | Feb. 4, 1941 |
| 1,991,680 | Jones | Feb. 19, 1935 |
| 2,154,108 | Olson | Apr. 11, 1939 |
| 1,833,807 | Wolpert et al. | Mar. 24, 1931 |
| 2,302,223 | Johnson | Nov. 17, 1942 |
| 2,354,755 | Johnson et al. | Aug. 1, 1944 |
| 2,068,138 | Johnson | Jan. 19, 1937 |
| 2,361,913 | Breese | Nov. 7, 1944 |
| 1,779,572 | Valjean | Oct. 28, 1930 |
| 2,286,137 | Johnson | June 9, 1942 |
| 2,337,484 | McCollum | Dec. 21, 1943 |